United States Patent Office 3,014,068
Patented Dec. 19, 1961

3,014,068
PREPARATION OF β-RESORCYLIC ACIDS
George G. Roller, Midland, Mich., assignor to The Dow Chemical Company, Midland, Mich., a corporation of Delaware
No Drawing. Filed May 4, 1959, Ser. No. 810,555
6 Claims. (Cl. 260—517)

This invention relates to methods for preparing certain organic acids. Specifically, the methods related to are those for the preparation of β-resorcylic acid and 5-benzoyl-β-resorcylic acid.

A method has been reported in the literature for the preparation of 5-benzoyl-β-resorcylic acid and consists of the benzoylation of methyl-β-resorcylate and saponification of the methyl ester with aqueous sodium hydroxide. A second reported method consists of the rearrangement of methyl 2,4-dibenzoyloxybenzoate. However, both of these methods are characterized by the production of low yields.

It has now been discovered that 5-benzoyl-β-resorcylic acid can be prepared in good yield by a method that is quickly and easily carried out. 5-benzoyl-β-resorcylic acid is prepared, according to the method of the present invention, by contacting with sulfuric acid 3,5-dibenzoyl-β-resorcylic acid having the formula:

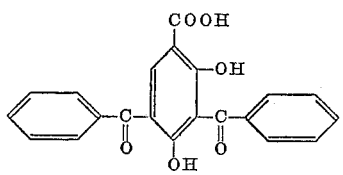

at above room temperature, desirably between 70–100° C., preferably between 90–100° C., and separating the desired product from the reaction mixture. The sulfuric acid is used in the form of a concentrated aqueous solution, containing preferably from 75 to 90 percent by weight of sulfuric acid, in excess of the stoichiometric requirement, and in an amount sufficient to insure complete solubility of the 3,5-dibenzoyl-β-resorcylic acid. After the reaction is complete, the reaction mixture is cooled and diluted with water, as by pouring onto a quantity of ice. The reaction mixture is then filtered and the desired product, 5-benzoyl-β-resorcylic acid, separated from the insoluble residue, as by washing the residue with hot water; the hot water-insoluble 5-benzoyl-β-resorcylic acid remains as a residue after the hot water washing. Purification may be effected by recrystallization from a suitable solvent, such as aqueous methanol, if desired.

In addition, it has been discovered that β-resorcylic acid can be prepared easily from 3,5-dibenzoyl-β-resorcylic acid or a monobenzoyl-β-resorcylic acid by following a procedure similar to that hereinbefore described. In the method of the present invention, 3,5-dibenzoyl-β-resorcylic acid is contacted with sulfuric acid, and the mixture heated at above 100° C., desirably at 110°–130° C., preferably at about 120° C. The reaction mixture is then cooled, and the desired product, β-resorcylic acid, separated from the reaction mixture by dilution with water, filtration, and washing of the filtered residue with hot water.

The sulfuric acid is used in the form of a concentrated aqueous solution, containing preferably from 75 to 90 percent by weight of sulfuric acid.

The following examples are given to illustrate the present invention, but are not to be construed as limiting the invention thereto.

Example I

A mixture of 50 grams (0.14 mole) of 3,5-dibenzoyl-β-resorcylic acid and 250 milliliters of 85 percent by weight of sulfuric acid was heated in a 500 ml. round-bottom flask for one hour at 95° C. The reaction mixture was cooled and poured onto ice and then was filtered using a Buchner funnel. The solid residue thus separated was washed three times with hot water. There were obtained 17 grams (57 percent of the theoretical yield) of hot water-insoluble 5-benzoyl-β-resorcylic acid melting at 232–235° C.

Analysis.—Calculated: C, 65.12; H, 3.90. Found: C, 65.04; H, 3.76.

Example II

In a manner similar to that in Example I, 50 grams (0.14 mole) 3,5-dibenzoyl-β-resorcylic acid and 250 ml. of 85 percent by weight of sulfuric acid were mixed and heated for 30 minutes at 120° C. Upon separation from the reaction mixture, the product was found to consist of β-resorcylic acid and benzoic acid, as confirmed by infrared analysis.

The 3,5-dibenzoyl-β-resorcylic acid used as the starting material in the aforementioned examples was prepared as follows:

A mixture of 770 grams (5.0 moles) of β-resorcylic acid, 2133 grams (16.0 moles) of aluminum chloride, and 2.5 liters of 1,3,4-trichlorobenzene was heated to 130° C. 1540 grams (11.0 moles) of benzoyl chloride in 770 grams of 1,3,4-trichlorobenzene were then added over a period of 1½ hours and the mixture was heated an additional hour at about 130° C. The reaction complex and aluminum chloride were then destroyed by adding 3 normal hydrochloric acid to the hot mixture, the mixture stirred until decomposition was complete, and then cooled and filtered. This filtered product was then washed three times with two liter portions of Skellysolve having a boiling range of 35°–60° C., with cold trimethylpentane, and with boiling trimethylpentane. The product was then taken up in 10 percent aqueous sodium hydroxide solution, filtered, and washed with methanol. Recrystallization from methanol yielded 1013 grams of white crystals of 3,5-dibenzoyl-β-resorcylic acid, melting at 234.8° C.–236.0° C.

Various modifications may be made in the method of the present invention, without departing from the spirit or scope thereof, and it is to be understood that I limit myself only as defined in the appended claims.

I claim:

1. A method for preparing 5-benzoyl-β-resorcylic acid comprising contacting, at 70–100° C., 3,5-dibenzoyl-β-resorcylic acid with aqueous sulfuric acid solution containing 75–90 percent by weight of sulfuric acid and separating 5-benzoyl-β-resorcylic acid from the reaction mixture.

2. A method for preparing 5-benzoyl-β-resorcylic acid comprising contacting, at 90°–100° C., 3,5-dibenzoyl-β-resorcylic acid with aqueous sulfuric acid solution containing 75–90 percent by weight of sulfuric acid and separating 5-benzoyl-β-resorcylic acid from the reaction mixture.

3. A method for preparing β-resorcylic acid comprising contacting, at 110°–130° C., a monobenzoyl-β-resorcylic acid with aqueous sulfuric acid solution containing 75–90 percent by weight of sulfuric acid and separating β-resorcylic acid from the reaction mixture.

4. A method for preparing β-resorcylic acid comprising contacting, at 110°–130° C., 3,5-dibenzoyl-β-resorcylic acid with aqueous sulfuric acid solution containing 75–90 percent by weight of sulfuric acid and separating β-resorcylic acid from the reaction mixture.

5. A method for preparing β-resorcylic acid comprising contacting, at about 120° C., 3,5-dibenzoyl-β-resorcylic acid with aqueous sulfuric acid solution containing 75–90 percent by weight of sulfuric acid and separating β-resorcylic acid from the reaction mixture.

6. A method for preparing 5-benzoyl-β-resorcylic acid comprising mixing 3,5-dibenzoyl-β-resorcylic acid with aqueous sulfuric acid solution containing 75–90 percent by weight of sulfuric acid, heating the resulting mixture to 70–100° C., pouring this mixture onto ice, and separating 5-benzoyl-β-resorcylic acid from the reaction mixture.

References Cited in the file of this patent

Adams et al: "Organic Reactions," vol. I (1954), page 353.